United States Patent
Lee et al.

(10) Patent No.: US 9,413,607 B2
(45) Date of Patent: Aug. 9, 2016

(54) UPDATING PARAMETERS IN A NETWORK

(75) Inventors: Kenneth Lee, Cambridge, MA (US);
Vijay Vallala, North Andover, MA (US);
Steve Webster, Raymond, NH (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 110 days.

(21) Appl. No.: 14/369,070

(22) PCT Filed: Dec. 29, 2011

(86) PCT No.: PCT/US2011/067855
§ 371 (c)(1),
(2), (4) Date: Jun. 26, 2014

(87) PCT Pub. No.: WO2013/101072
PCT Pub. Date: Jul. 4, 2013

(65) Prior Publication Data
US 2015/0032870 A1    Jan. 29, 2015

(51) Int. Cl.
| | |
|---|---|
| G06F 15/177 | (2006.01) |
| H04L 12/26 | (2006.01) |
| G06F 5/00 | (2006.01) |
| H04L 12/24 | (2006.01) |
| H04L 1/18 | (2006.01) |
| H04L 12/28 | (2006.01) |
| H04L 29/06 | (2006.01) |

(52) U.S. Cl.
CPC .............. *H04L 41/082* (2013.01); *H04L 1/188* (2013.01); *H04L 12/2823* (2013.01); *H04L 41/00* (2013.01); *H04L 43/00* (2013.01); *H04L 43/0811* (2013.01); *H04L 69/16* (2013.01)

(58) Field of Classification Search
CPC ....... H04L 1/188; H04L 41/147; H04L 43/00; H04L 43/0811
USPC .............................. 709/221; 710/58; 370/252
See application file for complete search history.

(56) References Cited

U.S. PATENT DOCUMENTS

| | | | | | |
|---|---|---|---|---|---|
| 5,353,243 | A | * | 10/1994 | Read ................. | G01R 31/31919 703/2 |
| 6,085,244 | A | * | 7/2000 | Wookey .............. | G06F 11/2294 709/223 |

(Continued)

OTHER PUBLICATIONS

Allen-Bradley, EtherNet/IP Modules in Logix5000 Control Systems, 2010, 228 pages.*

(Continued)

*Primary Examiner* — Hieu Hoang
(74) *Attorney, Agent, or Firm* — Banner & Witcoff, Ltd.

(57) ABSTRACT

A system, method, and software product are provided for updating parameters, such as requested packet intervals (RPIs), in a network. The system may include one or more PLCs, communication controllers, and I/O devices coupled in a communication network, such as EtherNet/IP. A request to change a parameter (e.g., scanning rate or timeout value) is transmitted from the PLC to an I/O device specifying a new parameter value or time-out value. The I/O device may receive the message, use a temporary time-out value while processing the message, and transmit an acknowledgement confirming the new value to the PLC. The I/O device may use the updated parameter and new time-out value. The updated parameter may be implemented without the need to take down and re-establish network connections to the affected devices.

17 Claims, 5 Drawing Sheets

(56) References Cited

U.S. PATENT DOCUMENTS

| | | | |
|---|---|---|---|
| 7,530,113 B2 * | 5/2009 | Braun | G05B 19/042 700/237 |
| 7,562,390 B1 * | 7/2009 | Kwan | H04L 63/0236 726/23 |
| 2003/0033030 A1 | 2/2003 | Naismith et al. | |
| 2004/0143628 A1 * | 7/2004 | Bradford | G05B 19/054 709/203 |
| 2005/0198232 A1 | 9/2005 | Haalen et al. | |
| 2007/0005166 A1 * | 1/2007 | Chen | H04L 12/66 700/96 |
| 2007/0058929 A1 * | 3/2007 | Chaffee | G05B 19/0423 386/316 |
| 2007/0198749 A1 * | 8/2007 | Vazach | G06F 13/12 710/2 |
| 2008/0049624 A1 | 2/2008 | Ray et al. | |
| 2009/0093894 A1 * | 4/2009 | Shin | H04L 41/082 700/86 |
| 2011/0141911 A1 | 6/2011 | Washam et al. | |
| 2011/0173354 A1 * | 7/2011 | Hall | G05B 19/045 710/58 |

OTHER PUBLICATIONS

Jun. 24, 2015—(EP) Extended Search Report—App 11878800.9.

Semi E54.13-1303 Specification for Sensor/Actuator Network Communications for Ethernet/IP, Semi, 3081 Zanker Road, San Jose, CA 95134, USA, Jan. 1, 2003, XP040460351, secontions 5 to 7, tables 4, 6, 10 pages.

Ethernet/IP: Industrial Protocol White Paper, Oct. 1, 2001, XP055106212, Retrieved from the Internet: URL:http://literature.rockwellautomation.com/ids/groups/literature/documents/wp/enet-wp001_-en-p.pdf [retrieved on Mar. 7, 2014], the whole document, 12 pages.

International Search Report and Written Opinion mailed Apr. 30, 2012 (PCT/US2011/067855); ISA/US.

* cited by examiner

UPDATING PARAMETERS IN A NETWORK

CROSS-REFERENCE TO RELATED APPLICATIONS

The present application is a U.S. National Phase filing of International Application No. PCT/US2011/067855, filed on Dec. 29, 2011, designating the United States of America, and this application claims priority to and the benefit of the above-identified application, which is incorporated by reference herein in its entirety.

BACKGROUND

Factory automation systems often include one or more Programmable Logic Controllers (PLCs) coupled to other devices, such as remote I/O devices, over one or more communication networks. In a factory or other industrial setting, such networks may include dozens or hundreds of sensors that constantly monitor such things as temperatures, fluid levels, or robotic arm positions. The sensors may be coupled to one or more remote I/O devices that report back to the PLC many times per second. The PLC may include rules for acting on the changing conditions, such as issuing commands to other devices over the network to perform various operations in the system.

As one example, the Ethernet/Industrial Protocol (EtherNet/IP) network standard allows industrial devices to communicate over an Ethernet-like network. When the network is first initialized, devices communicate with each other regarding the frequency with which each device will send out updates (e.g., once every 10 milliseconds) and a time-out value (usually specified as a multiplicative factor related to the update frequency) specifying the time after which a particular device will be deemed to have failed if no update is received (e.g., 40 milliseconds). For example, upon initialization, a PLC may transmit messages to remote I/O devices instructing each device to report updates according to a specified schedule (sometimes referred to as "scanning rates" or "requested packet interval" or RPI for short), and providing device time-out values. Thereafter, when the system is operational, each remote I/O device may take measurements or perform other functions (e.g., setting a switch, turning on a motor, or controlling a valve) based on the instructed scanning rate and time-out value.

One difficulty that can arise in such networks is that there may be a need to change the scanning rates for one or more I/O devices once the system is operational. Unfortunately, changing the rates may require shutting down the system (stopping the PLC and/or rebooting various devices in the network) in order to load new values into the devices. This is because in EtherNet/IP-based systems, the connection to the affected device must be dropped and then re-initiated using new parameters. Such an operation may lead to sequencing problems between the PLC and the affected device and/or possible loss of data, which may be unacceptable. Shutting down an industrial system, particularly for a large factory or other industrial plant, may be costly. It would therefore be desirable to permit parameters, such as scanning rates and time-out values, to be modified without requiring the stopping and restarting various devices.

SUMMARY

Described herein are a system, method, and software product for updating parameters, such as scanning rates and timeout values, in a network. The system may include one or more PLCs, communication controllers, and I/O devices coupled in a communication network, such as an EtherNet/IP-based network. A user interface or other software program may specify a change to a scanning rate for one or more I/O devices. In response, the PLC may transmit a message to the one or more I/O devices including a new scanning rate and, optionally, a new time-out value. The I/O devices may receive the message, use a temporary time-out value while processing the message, and transmit an acknowledgement confirming the new value to the PLC. The I/O device may use the updated scanning rate and new time-out value. Such updated scanning rates may be implemented without the need to take down and re-establish network connections to the affected devices.

Different scanning rates and time-out values may be provided for one or both the PLC and each remote I/O device, such that bi-directional messages may be affected by the change. In some variations, an EtherNet/IP explicit message is used to transmit the updated scanning rate, and EtherNet/IP implicit messages are used to transmit data between the PLC and the I/O devices.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
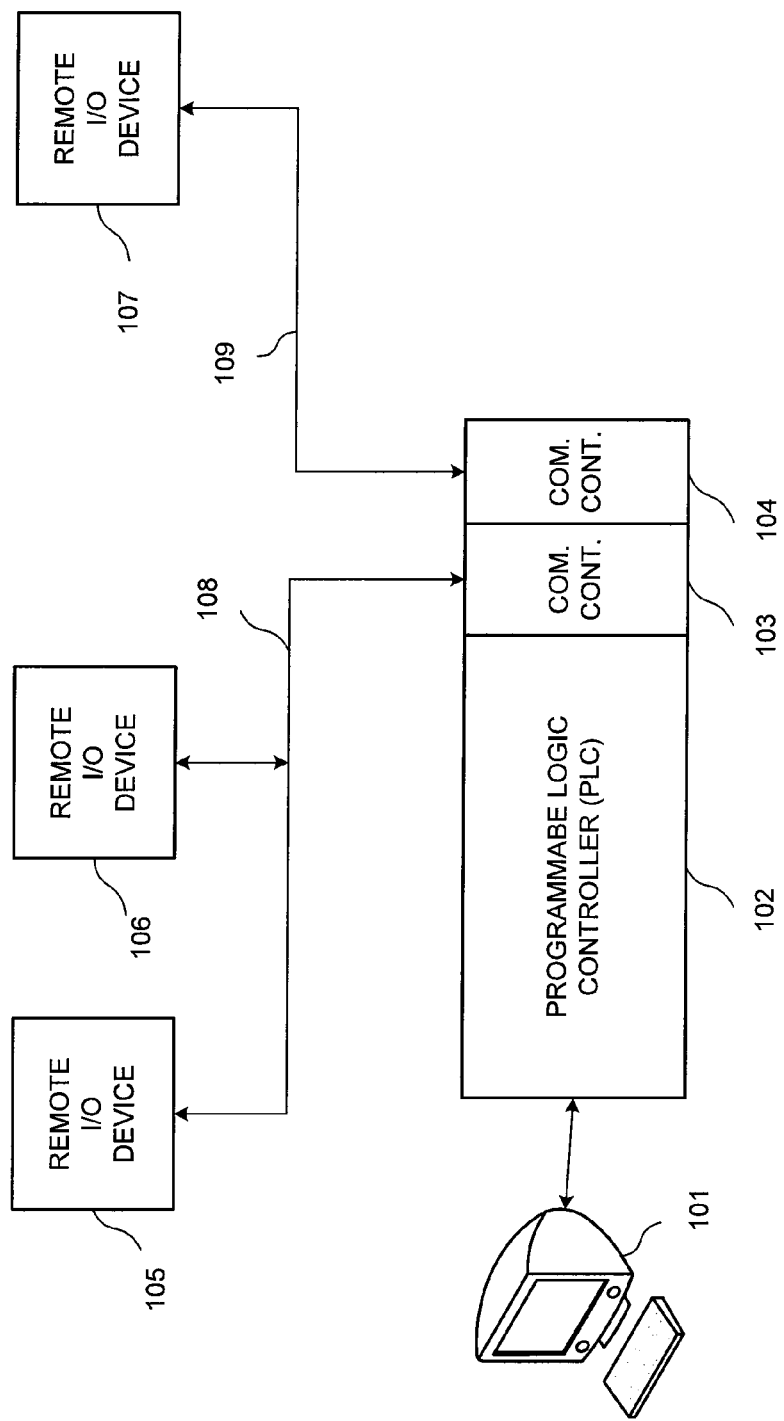
FIG. 1 is a block diagram of a system in which various principles described herein may be implemented.

FIG. 1 is a block diagram showing a system in which various embodiments of the invention may be practiced. A user console 101, which may comprise a personal computer or other computing device, is coupled to a programmable logic controller (PLC) 102 over a network (e.g., Ethernet or Wide Area Network) or other type of connection (e.g., USB). Generally, console 101 may comprise one or more processors and memory storing application software and/or a user interface that allows a user or a computer program to configure, alter, and control the operation of functions in PLC 102. PLC 102 may comprise any of various types of commercially available PLCs, such as the Modicon™ Quantum™ PLC available from Schneider Electric, Inc. Console 101 may include commercially available software development software such as Unity Pro™, also available from Schneider Electric, Inc.

PLC 102 may be coupled to one or more communication controllers 103 and 104 through any of various means, such as a backplane interconnection or other means. Each communication controller handles communication with one or more remote I/O devices, such as devices 105, 106, and 107, over one or more networks 108 and 109. As discussed previously, each remote I/O device may perform one or more functions such as monitoring sensors or controlling industrial equipment. In some variations, a single network may be provided to connect multiple communication controllers 103 and 104 to multiple I/O devices. In other variations, separate networks may be provided, each having a corresponding communication controller. Although devices 105 through 107 are shown as "remote" I/O devices, such devices may be co-located with PLC 102, or a mixture of remote and local I/O devices may be provided.

In some embodiments, networks 108 and 109 may comprise an EtherNet/IP (Ethernet/Industrial Protocol) network and may conform to one or more standards managed by the Open Device Vendors Association (ODVA), which is generally designed for use in process control and other industrial automation applications. In such networks, basic I/O data such as parameter measurements and control messages are handled via implicit messaging using User Datagram Protocol (UDP). Uploading and downloading of parameters, setpoints, and programs are generally handled via Transmission Control Protocol (TCP) (explicit messaging).

When PLC 102 is initialized (i.e., it boots up), it generates messages using explicit messaging to the remote I/O devices to set various parameters, such as I/O scan rates and device timeouts. For example, PLC 102 may transmit a message to remote I/O device 105 commanding it to provide an updated temperature from a corresponding sensor every 10 milliseconds, with a time-out value of 40 milliseconds (i.e., the I/O device will be deemed to have timed-out if no update is received within 40 milliseconds of the previous data). PLC 102 may also transmit a message to remote I/O device 105 indicating to device 105 that PLC 102 will transmit a data message every 100 milliseconds, with a time-out value of 400 milliseconds (i.e., the PLC will be deemed to have timed-out if no data message is received within 400 milliseconds of the previous data message).

During operation, the devices generally transmit update messages using implicit messaging, as explained above. According to some aspects of the invention, a user of console 101 (or a computer program) may instruct PLC 102 to change one or more parameters, such as a scan rate, for devices operating in the system without the need to tear down and re-establish connections to the devices. These aspects are described in more detail with reference to FIG. 2.

Figure 2:
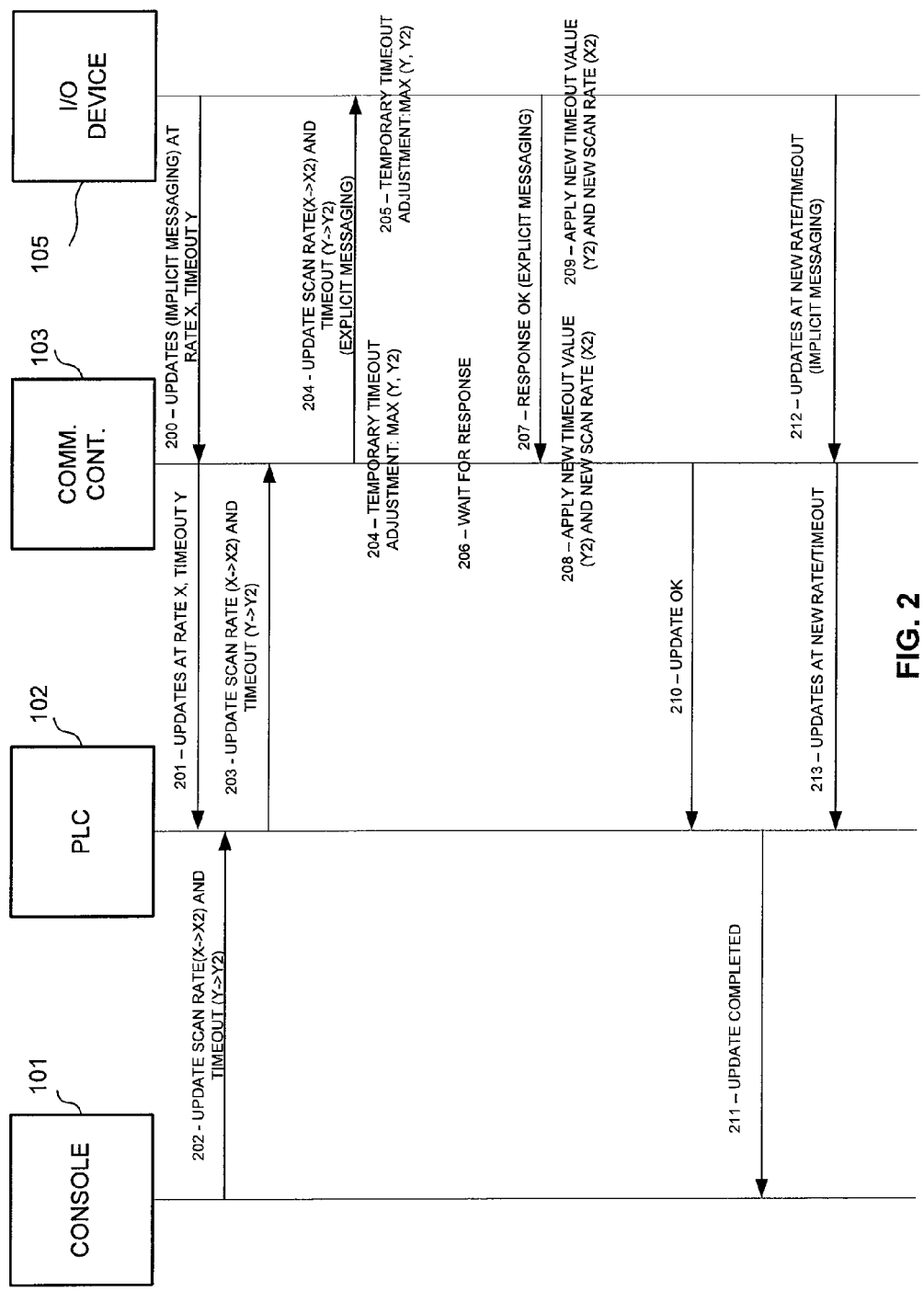
FIG. 2 is a flow diagram showing message flows according to one variation of the invention.

FIG. 2 shows a process for updating a scan rate and timeout value, wherein both values are successfully changed. At the right side of FIG. 2, it is assumed that updates 200 are being received from I/O device 105 at an existing scan rate X and timeout value Y. Such updates may be sent using implicit messaging in accordance with EtherNet/IP protocol (e.g., UDP). These updates are also transmitted in step 201 to PLC 102, where they may be used in an industrial control process.

Although not explicitly shown in FIG. 2, updates (in the form of commands or other signals) may also be sent from the PLC to various I/O devices in the left-to-right direction. Such updates may have separate and independent scan rates and timeout values, such that each I/O device may expect to receive messages from the PLC at a certain scan rate and timeout value. Such bi-directional messages are included within the scope of the invention, although they are omitted from the figures for clarity. In other words, changes to the scan rate and timeout values for the PLC may be made in the same manner as described below.

In step 202 (left side of FIG. 2), a decision is made by a human or a computer program to change one or more parameters, such as scan rates and/or timeout values in the system. (Alternatively, the decision could be made directly by the PLC, for example in response to detecting that a value from a particular sensor has reached a certain value). For example, a decision might be made to change the scan rate for remote I/O device 105 from every 10 milliseconds to every 50 milliseconds, and to increase the time-out value from 200 milliseconds to 400 milliseconds. (As explained above, the time-out value may be represented as a multiplicative factor of the update frequency.) In step 202, the new scan rate (X to X2) and timeout value (Y to Y2) may be transmitted over a network, such as an Ethernet, to PLC 102.

In step 203, PLC 102 transmits a message to communication controller 103 to update the scan rate (X to X2) and timeout value (Y to Y2). In step 204, communication controller 103 transmits a message to I/O device 105 requesting that the scan rate be changed from X to X2 and the timeout value from Y to Y2. (In some variations, only one of the values may be changed, rather than both values). This message may be sent using explicit messaging (e.g., TCP) in the EtherNet/IP protocol. In some variations, communications controller 103 may convert the request into an explicit message; in other variations, PLC 102 may construct an explicit message and provide it to communications controller 103.

At or about the same time, communications controller 103 temporarily adjusts the timeout value for I/O device 105. In one variation, the temporary timeout value is set to be the larger of the new timeout value and the old timeout value. This is done to ensure that the I/O device will not be deemed to have prematurely timed out before it has been able to change its internal operating conditions to the new values. In step 205, I/O device 105 may also temporarily adjust its timeout value to the larger of the new timeout value and the old timeout value. (If changing a parameter in the opposite direction, e.g., updates from the PLC to the I/O devices, a smaller of the old and new scan rates may also be used during the change).

In step 206, communications controller 103 waits for a response from I/O device 105 to confirm the change, while temporarily using the larger of the two timeout values when dealing with device 105. In step 207, I/O device 105 sends a response (preferably via explicit messaging) confirming that the new values were accepted. In step 208, communication controller 103 begins permanently applying the new timeout value and new scan rate. In step 209, I/O device 105 begins applying the new timeout value and scan rate. In step 210, communications controller 103 sends a confirmation message to PLC 102 that the updates have been made, and in step 211 PLC 102 sends a message to console 101 confirming the change. Console 101 may reflect the updated values in one or more databases; display them on a user interface; and/or may transmit them to other devices (not shown). Thereafter, updates 212 and 213 may occur at the newly-changed rate and/or timeout values.

Instead of the procedure described above to select a temporary timeout value, a sufficiently large default timeout value may be chosen that will be large or small enough to avoid inadvertently determining that the device has timed out during the change operation. Once the change has been made and acknowledged by the device, the original timeout value (or new timeout value, if one was specified) may be used.

Figure 3:
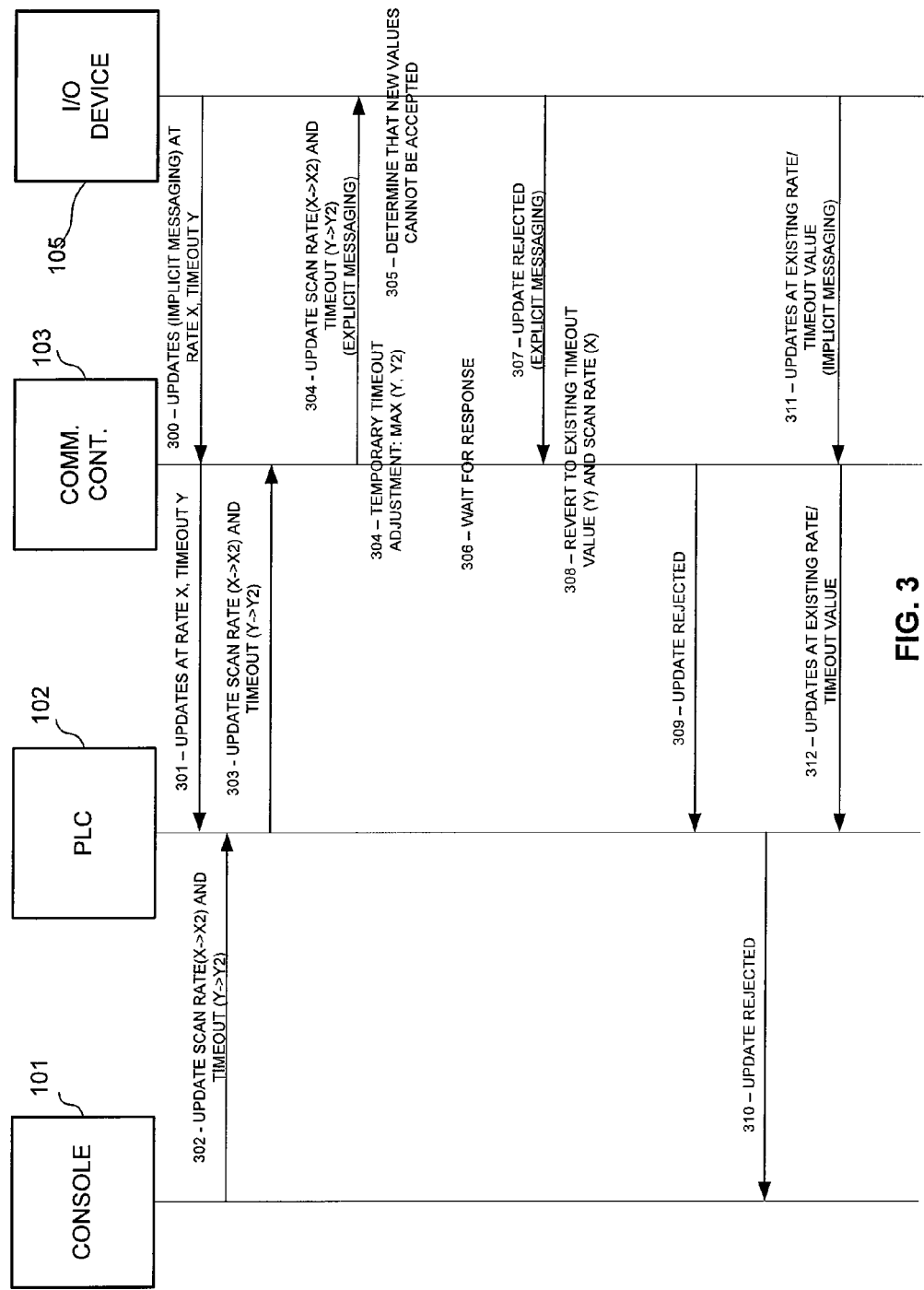
FIG. 3 is a flow diagram showing message flows according to another variation of the invention.

FIG. 3 shows a process for updating a scan rate and timeout value, wherein the target I/O device rejects the request to change the scan rate and/or timeout value. For example, the target I/O device may be unable to support a scan rate that is higher than a certain rate, or it may be unable to handle a timeout value that is too low. There may be other reasons for explicitly rejecting a request to change these parameters. The process flow is similar to that shown in FIG. 2, but with some differences.

At the right side of FIG. 3, it is assumed that updates 300 are being received from I/O device 105 at an existing scan rate X and timeout value Y. Such updates may be sent using implicit messaging in accordance with EtherNet/IP protocol (e.g., UDP). These updates are also transmitted in step 301 to PLC 102, where they may be used in an industrial control process.

In step 302 (left side of FIG. 3), decision is made to change one or more update rates and/or timeout values in the system. Also in step 302, the new scan rate (X to X2) and timeout value (Y to Y2) may be transmitted over a network, such as an Ethernet, to PLC 102.

In step 303, PLC 102 transmits a message to communication controller 103 to update the scan rate (X to X2) and timeout value (Y to Y2). In step 304, communication controller 103 transmits a message to I/O device 105 requesting that the scan rate be changed from X to X2 and the timeout value from Y to Y2. This message may be sent using explicit messaging (e.g., TCP) in the EtherNet/IP protocol. In some variations, communications controller 103 may convert the request into an explicit message; in other variations, PLC 102 may construct an explicit message and provide it to communications controller 103.

At or about the same time, communications controller 103 temporarily adjusts the timeout value for I/O device 105. In one variation, it is adjusted to be the larger of the new timeout value and the old timeout value. This is done to ensure that the I/O device will not be deemed to have prematurely timed out before it has a chance to change its internal operating conditions to the new values. In step 305, I/O device 105 determines that one or more of the newly-proposed values cannot be accepted.

In step 306, communications controller 103 waits for a response from I/O device 105 to confirm the change, while temporarily using the larger of the two timeout values when dealing with device 105. In step 307, I/O device 105 sends a rejection response (preferably via explicit messaging) rejecting one or more of the updated values.

In step 308, communication controller 103 reverts to the previously-existing timeout value (Y) and scan rate (X). In step 309, communication controller 103 sends a rejection message to PLC 102, and in step 310 PLC 102 sends a message to console 101 indicating that the update request was rejected. Console 101 may reflect the rejection in one or more databases, display them on a user interface, and/or may transmit them to other devices (not shown). Thereafter, updates 311 and 312 may continue at the original (unchanged) rates and/or timeout values.

Figure 4:
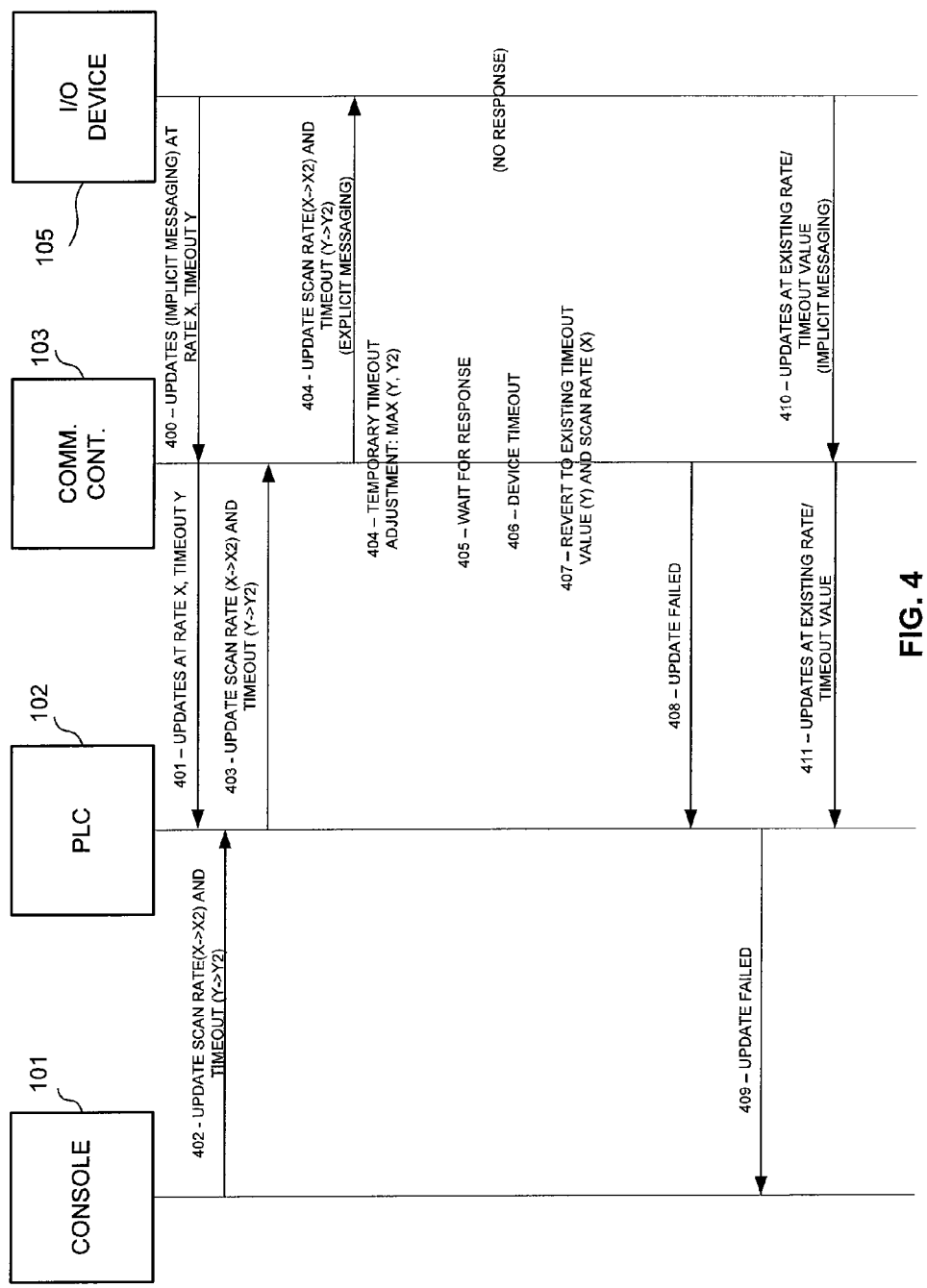
FIG. 4 is a flow diagram showing message flows according to yet another variation of the invention.

FIG. 4 shows a process for updating a scan rate and timeout value, wherein the target I/O device does not respond to the request within the temporary timeout period. For example, the target I/O device may be unable to support a request to change an existing scan or timeout rate without re-establishing a connection; it may be offline or turned off; it might have never received the message; or there may be some other reason for not responding within the temporary timeout period. The process flow is similar to that shown in FIG. 3, but with some differences.

At the right side of FIG. 4, updates 400 may be received from I/O device 105 at an existing scan rate X and timeout value Y. Such updates may be sent using implicit messaging in accordance with EtherNet/IP protocol (e.g., UDP). These updates may also be transmitted in step 401 to PLC 102, where they may be used in an industrial control process.

In step 402 (left side of FIG. 4), decision is made to change one or more update rates and/or timeout values in the system. In step 402, the new scan rate (X to X2) and timeout value (Y to Y2) may be transmitted over a network, such as an Ethernet, to PLC 102.

In step 403, PLC 102 transmits a message to communication controller 103 to update the scan rate (X to X2) and timeout value (Y to Y2). In step 404, communication controller 103 transmits a message to I/O device 105 requesting that the scan rate be changed from X to X2 and the timeout value from Y to Y2. This message may be sent using explicit messaging (e.g., TCP) in the EtherNet/IP protocol. In some variations, communications controller 103 may convert the request into an explicit message; in other variations, PLC 102 may construct an explicit message and provide it to communications controller 103.

At or about the same time, communications controller 103 temporarily adjusts the timeout value for I/O device 105. In one variation, it is temporarily set to be the larger of the new timeout value and the old timeout value. This is done to ensure that the I/O device will not be deemed to have prematurely timed out before it has a chance to change its internal operating conditions to the new values. In step 405, I/O device 105 waits for a response from I/O device 105.

Upon receiving no response within the temporary timeout period, in step 406 communication controller 103 determines that the device has timed out. (The timeout value for an explicit message can be different from the temporary value calculated for an I/O data connection). Therefore, in step 407, communication controller 103 reverts to the previously existing timeout value and scan rate. In step 408, communications controller 103 sends a failure message to PLC 102, and in step 409 PLC 102 sends a message to console 101 indicating that the update request failed. Console 101 may reflect the failure in one or more databases, display them on a user interface, and/or may transmit them to other devices (not shown).

If device 105 is still operational, it may continue to send updates in step 410 and those updates may be communicated from communication controller 103 to PLC 102 (step 411).

As explained above, because the PLC is able to attempt to change parameter values (e.g., I/O device scan rates) without jeopardizing timeouts or synchronization problems with the devices, the parameter values can be changed without the need to stop the PLC, take down and re-establish network connections to the device, and possibly rebooting the system, thus potentially saving costs.

Figure 5:
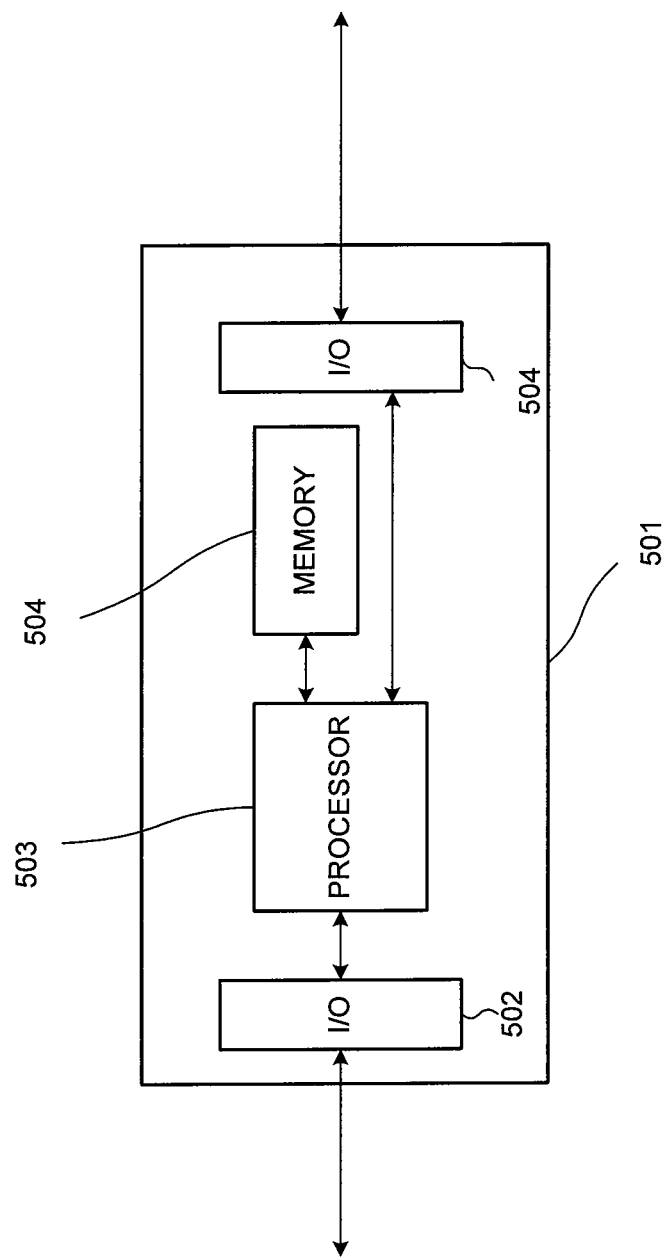
FIG. 5 shows one possible implementation for a communication controller.

FIG. 5 shows one possible implementation for a communication controller 501 to carry out the functions described above. Communications controller 501 may include one or more processors 503 and one or more memories 504 having stored therein instructions that perform the functions described above. The controller may also include one or more I/O circuits 502 and 504 to communicate with PLC 102 and one or more I/O devices. As explained previously, communication with PLC 102 may be via a backplane bus using proprietary protocols, whereas communication with one or more I/O devices may be via EtherNet/IP protocols. References to a processor and memory are also intended to encompass various types of processing structures including, but not limited to, application-specific integrated circuits (ASICs) and field programmable gate arrays (FPGAs).

In some variations, there may be multiple I/O data connections between the PLC and each device, and each data connection may have parameters that are adjusted independently according to the principles described above.

The functions and steps described above may be implemented by hardware and/or by software stored in tangible computer-readable media (e.g., a memory) and executed by various computing devices or apparatus, such as a server computer including one or more processors programmed with software.

As explained previously, the decision to change a parameter value may be generated internally by the PLC or other device, rather than being generated externally by a human or computer program external to the PLC. Accordingly, the phrase "request to set a new parameter value" is intended to encompass such internally-generated decisions.

The divisions between functional blocks in the figures are merely illustrative, and the physical division of computing devices and other equipment may be different from the functional division. Moreover, some or all of the functional blocks may be combined or further subdivided functionally and/or physically. For example, devices 102 and 103 could be combined into a single device, and even the functions of console 101 could be combined into a single device, such as an industrial PC.

Unless otherwise explicitly stated, steps of method claims (and corresponding functional elements) herein should not be limited to being performed in the order in which they are recited.

What is claimed is:

1. A method, comprising:
   receiving a request to set a new parameter value of at least a communication timeout parameter or both of a scan rate parameter and the communication timeout parameter stored on a device on an EtherNet/IP-based network, wherein the device is operating according to a previous parameter value wherein the request to set the new parameter value is generated in response to information received from the device;
   comparing, by a communications controller, a temporary communication timeout value to an existing communication timeout parameter value, wherein the temporary communication timeout value corresponds to a new communication timeout value to be stored in the communication timeout parameter;
   establishing, by the communications controller, a temporary timeout period corresponding to the request to set the new parameter value stored on the device, wherein the temporary timeout period is set to the larger of the temporary communication timeout value or the existing communication timeout value based on the comparing;
   transmitting a message over the EtherNet/IP-based network to the device, wherein the message requests a change to the new parameter value; and
   reverting from the temporary communication timeout value to the previously existing communicating timeout parameter value.

2. The method of claim 1, further comprising the step of: communicating with the device according to the new parameter value.

3. The method of claim 1, wherein the message comprises an explicit message.

4. The method of claim 3, wherein the message comprises a Transmission Control Protocol (TCP) message.

5. The method of claim 1, wherein the request to set a new parameter value is received from a programmable logic controller, and wherein the step of using the temporary communication timeout value is performed in a communications controller coupled to the programmable logic controller.

6. The method of claim 1, wherein the new parameter value comprises a new requested packet interval (RPI).

7. The method of claim 1, further comprising the step of: when either a rejection response is received from the device or no response is received from the device within the temporary communication timeout value, reverting to the existing communication timeout value and the previous parameter value for further communications with the device.

8. The method of claim 1, further comprising the step of receiving updates from the device using implicit messaging.

9. Apparatus comprising: a processor; and a memory storing instructions that, when executed by the processor, cause the apparatus to:
   receive a request to set a new parameter value for a communication timeout parameter stored on a device on an EtherNet/IP-based network, wherein the device is operating according to a previous parameter value;
   compare a temporary communication timeout value for the device to an existing communication timeout value of the communication timeout parameter;
   establish, by the communications controller, a temporary timeout period corresponding to the request to set the new parameter value on the device, wherein the temporary timeout period is set to the larger of the temporary communication timeout value and the existing communication timeout value;
   transmit a message over the EtherNet/IP-based network to the device, wherein the message requests a change to the new parameter value; and
   revert from use of the temporary timeout value to use of the previously existing communication timeout value.

10. The apparatus of claim 9, wherein the instructions further cause the apparatus to communicate with the device according to the new parameter value.

11. The apparatus of claim 9, wherein the message comprises an explicit message.

12. The apparatus of claim 11, wherein the message comprises a Transmission Control Protocol (TCP) message.

13. The apparatus of claim 9, wherein the request to set a new parameter value is generated by a programmable logic controller, and the temporary communication timeout value is used by a communications controller coupled to the programmable logic controller.

14. The apparatus of claim 9, wherein the new parameter value comprises a new requested packet interval (RPI).

15. The apparatus of claim 9, wherein the new parameter value comprises a new communication timeout value for the device.

16. The apparatus of claim 9, wherein the instructions cause the apparatus to: when either a rejection response is received from the device or no response is received from the device within the temporary communication timeout value, revert to the existing communication timeout value and the previous parameter value for further communications with the device.

17. The apparatus of claim 9, wherein the instructions cause the apparatus to receive updates from the device using implicit messaging.

* * * * *